United States Patent [19]

Kaltz et al.

[11] Patent Number: 4,543,747
[45] Date of Patent: Oct. 1, 1985

[54] RETRACTABLE BACKLIGHT APPARATUS FOR VEHICLES

[75] Inventors: Milton C. Kaltz, Allen Park; Michael P. Alexander, Grosse Ile, both of Mich.

[73] Assignee: ASC Incorporated, Southgate, Mich.

[21] Appl. No.: 526,559

[22] Filed: Aug. 25, 1983

[51] Int. Cl.⁴ .............................................. E05D 15/28
[52] U.S. Cl. ........................................ 49/249; 49/250; 49/252; 296/146
[58] Field of Search .................. 296/146; 49/250, 246, 49/248, 252, 348, 349, 352

[56] References Cited

U.S. PATENT DOCUMENTS

| | | | |
|---|---|---|---|
| 2,436,728 | 2/1948 | Parsons | 296/44 |
| 2,531,116 | 11/1950 | Donoghue | 49/349 |
| 2,714,035 | 7/1955 | Limberg et al. | 296/146 X |
| 2,747,921 | 5/1956 | Hooverson et al. | 296/44 |
| 2,747,923 | 5/1956 | McLean | 296/44 |
| 2,762,648 | 9/1956 | Huzzard | 296/44 |
| 2,836,457 | 5/1958 | Beerman | 296/44 |
| 3,332,169 | 7/1967 | Lohr et al. | 49/249 |
| 3,333,362 | 8/1967 | Kostin et al. | 49/248 |

Primary Examiner—Kenneth Downey
Attorney, Agent, or Firm—Basile, Weintraub & Hanlon

[57] ABSTRACT

A retractable backlight apparatus for vehicles includes arcuate-shaped guide tracks mounted within the vehicle on opposite sides of the backlight panel. Rollers operably driven by a drive motor and connected to the backlight panel ride within the guide tracks to move the backlight panel between a raised, angled position closing the rear opening in the vehicle roof structure to a retracted, substantially vertical, stowed position within the interior of the vehicle. In one embodiment, a link is connected between a roller and the backlight panel and provides a final pivoting movement of the bottom edge of the backlight panel to bring the backlight panel into secure, sealing engagement in the vehicle roof structure when in the raised condition. A closure panel is pivotally mounted within the vehicle forward of the backlight panel and operably connected to the backlight panel to control the tilting movement of the backlight panel as the backlight panel moves between the raised and retracted positions.

8 Claims, 17 Drawing Figures

RETRACTABLE BACKLIGHT APPARATUS FOR VEHICLES

BACKGROUND OF THE INVENTION

1. Field of the Invention

This invention relates, in general, to vehicle roof structures and, specifically, to retractable backlight mechanisms for vehicles, and more specifically, to retractable backlight mechanisms for vehicles having a foldable convertible top.

2. Description of the Prior Art

A popular option on vehicles is a convertible top which is movable between a deployed position covering the passenger compartment to a retracted position in which a convertible top is folded and stored within the interior of the vehicle behind the rear seat. Such tops are provided with a backlight or rear window for viewing through the rear of the vehicle. Typically, such backlights have been formed of a flexible, transparent plastic so as to be able to fold with retraction of the convertible top. However, such plastic backlight panels are susceptible to cracking over long periods of use and frequently cloud or darken so as to limit viewing therethrough.

In an attempt to overcome the problems encountered with flexible, plastic backlights, rigid plastic and/or glass panels have been installed in convertible tops. However, the majority of such rigid panels cannot remain connected with the top when the top is folded and must be manually detached which is a time consuming and troublesome task. In those convertible top structures in which the rigid backlight remains attached to the convertible top during the raising and retracting movements, the backlight must necessarily be small in size which limits viewing toward the rear of the vehicle.

Other vehicle roof structures have been provided in which a powered, retractable mechanism is mounted within the backlight of the vehicle. Such retracting mechanisms, however, utilized numerous components which add to the cost of the vehicle, increase the complexity of the convertible roof structure and consume excessive space within the interior of the vehicle.

Thus, it would be desirable to provide a retractable backlight apparatus for vehicles which overcomes the problems encountered with previously devised backlight apparatus. It would also be desirable to provide a retractable backlight apparatus in which a large sized backlight may be employed. It would also be desirable to provide a retractable backlight apparatus which is simply constructed for a low manufacturing cost, minimum space consumption within the vehicle and can be reliably operated over a long time period. Finally, it would be desirable to provide a retractable backlight apparatus which raises and lowers a rigid backlight panel independently of movement of the convertible top.

SUMMARY OF THE INVENTION

The present invention is a retractable backlight apparatus for vehicles and, in particular, for vehicles having a foldable convertible top. The retractable backlight apparatus includes arcuate-shaped guide tracks mounted within the vehicle on opposite sides of the backlight panel. Rollers driven by a drive mechanism are connected to the backlight panel and ride within the guide tracks to move the backlight panel between a raised angled position closing the rear opening in the vehicle roof structure and a retracted, substantially vertical, stowed position within the interior of the vehicle.

In one embodiment, a U-shaped link is connected between the rollers and the backlight panel and provides a final outward pivoting movement of the bottom edge of the backlight panel to bring the backlight engagement with the vehicle roof structure when the backlight panel is in the raised position. A closure panel is pivotally mounted in the vehicle forward of the backlight panel. The closure member is pivotally connected to the U-shaped link by a control arm and includes guide members which slidingly receive opposed sides of the backlight panel to control tilting of the backlight panel as the backlight panel is moved between raised and retracted positions. In addition, the control arm effects pivoting of the closure member as the backlight panel is being raised or retracted so as to enable the backlight panel to slide behind the closure panel in the retracted position.

In another embodiment, a drive belt moves about a curved track mounted on a plate attached to the vehicle. One end of the drive belt is pivotally connected to the bottom edge of the backlight panel to move the backlight panel between raised and lowered positions. A pair of vertically extending, flexible guide tracks are mounted on opposite sides of the rear window opening in the vehicle roof structure and receive slider members connected to the upper edge of the backlight panel to control movement of the upper edge of the backlight panel between the raised and lowered positions.

The retractable backlight apparatus of the present invention uniquely enables a large size backlight panel to be installed in vehicles, and, especially vehicles having a foldable convertible top. The retractable backlight apparatus of the present invention moves the backlight panel between a raised position closing the rear opening in the vehicle roof structure to a vertical, stowed position within the interior of the vehicle independent from movement of the convertible top itself. The retractable backlight apparatus is simply constructed for a low manufacturing cost, long term reliability and minimal use of space within the interior of the vehicle.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Throughout the following description and drawing, an identical reference number is used to refer to the same component shown in multiple figures of the drawing.

Figure 1:
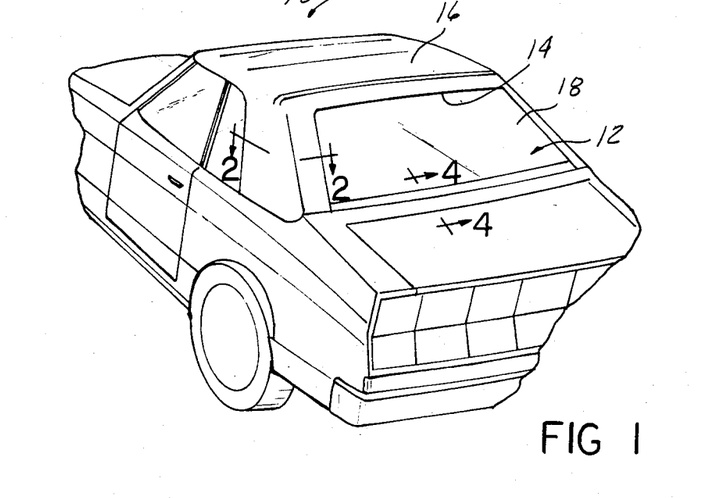
FIG. 1 is a perspective view of a vehicle having a retractable backlight apparatus constructed in accordance with the teachings of the present invention mounted therein.

Referring now to the drawing, and to FIG. 1 in particular, there is illustrated a vehicle 10 having a retractable backlight apparatus 12 constructed in accordance with the teachings of the present invention mounted within a rear opening 14 in the roof structure 16 of the vehicle 10. Preferably, the roof structure 16 comprises a conventional convertible top formed of a flexible material and including an appropriate linkage and drive mechanism so as to be deployable over the passenger compartment of the vehicle 10 and retractable into a folded position within the interior of the vehicle 10 behind the rear seat of the vehicle. Although not shown in FIG. 1, the convertible top 16 includes spaced, laterally extending bows, linkage members connected to the bows for effecting extension and retraction of the bows and top and a drive mechanism, such as fluid-operated cylinders mounted within the vehicle.

Preferably, the opening 14 is closed by a backlight panel 18, formed of a transparent material, such as glass, rigid plastic, etc. The backlight panel 18 has a substantially rectangular in configuration and is complimentary to the shape and size of the opening 14 in the roof structure 16 of the vehicle 10.

Figure 2:
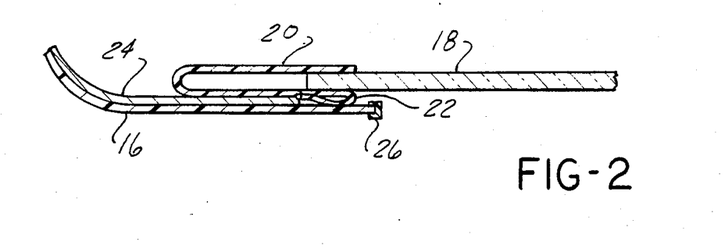
FIG. 2 is a cross-sectional view, generally taken along line 2—2 in FIG. 1.

As shown more clearly in FIG. 2, a flexible edge strip 20 is affixed at one end to the side edge of the backlight panel 18 by suitable means, such as by dielectric embossing. The opposite end of the edge strip 20 is looped back on itself and secured or stitched together to form a loop 22 which acts as a seal when the backlight panel 18 is in the fully raised position closing the opening 14 in the roof structure 16 of the vehicle 10.

As is conventional, a stay pad 24 is mounted interiorally on the convertible top 16 at the side and rear edge areas to provide a fixed shape to the flexible convertible top. The edge of the convertible top 16 bounding the rear or backlight opening 14 includes a beading strip 26.

As shown in FIG. 2, when the backlight panel 18 is in the raised position, the loop 22 at the end of the edge strip 20 is in registry with the edge of the convertible top 16 to form a seal which prevents the entry of water and other foreign matter into the interior of the vehicle 10.

Referring now to FIGS. 3, 4, 5 and 6, there is illustrated a retractable backlight apparatus 12 constructed in accordance with one embodiment of the present invention. The retractable backlight apparatus 12 functions to move the backlight panel 18 between an upper raised position, shown in FIG. 3, to a retracted position in which the backlight panel 18 is stowed substantially vertically within the interior of the body thereby opening the rear opening 14 in the convertible top 16 so as to enable the convertible top 16 to be retracted.

Figure 3:
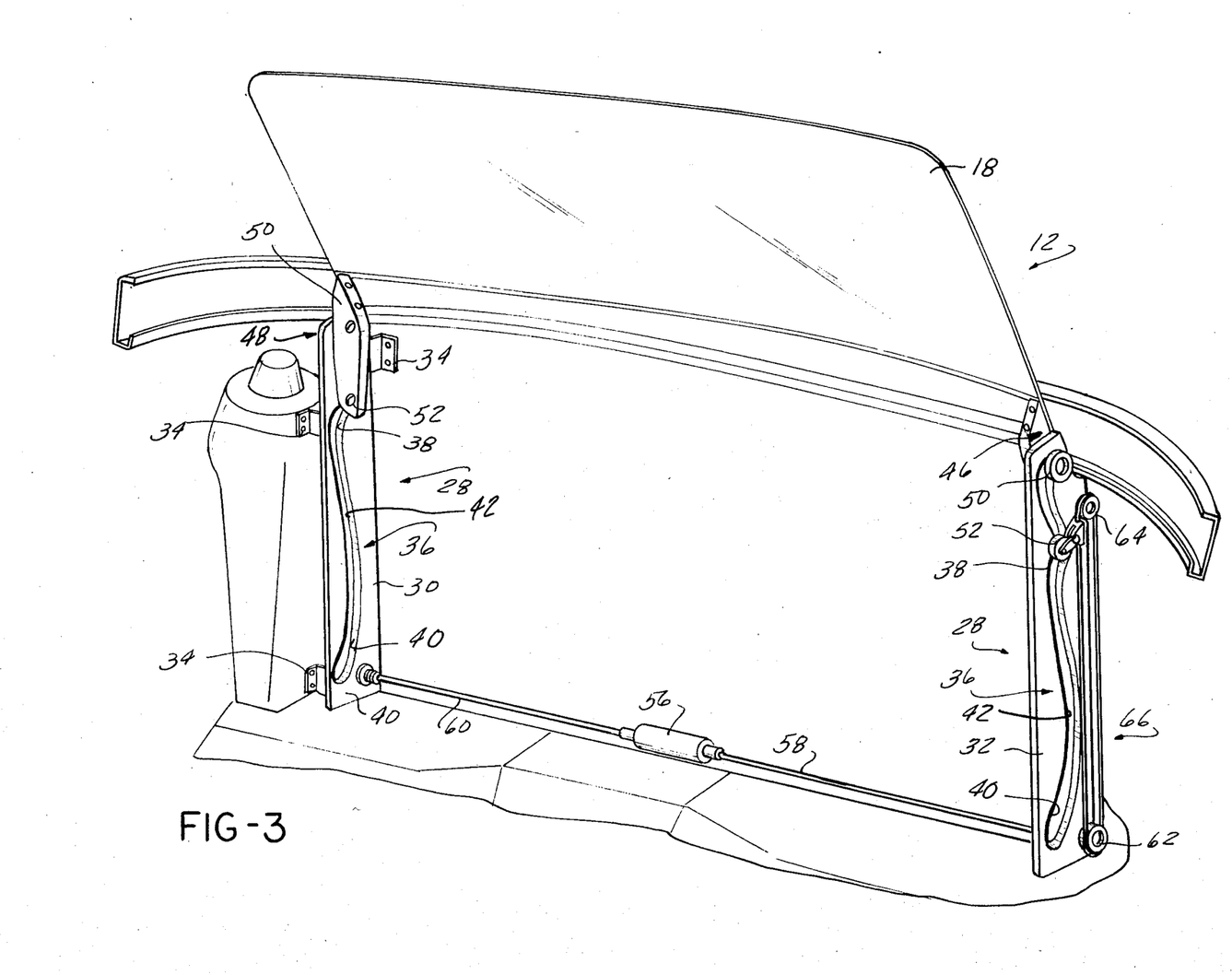
FIG. 3 is an enlarged, perspective view of one embodiment of the retractable backlight apparatus of the present invention.

In the embodiment shown in FIG. 3, the retractable backlight assembly 12 includes guide means 28 in the form of opposed, spaced panels 30 and 32 which are secured to the interior structure of the vehicle 10 by mounting brackets 34. The panels 30 and 32 extend substantially vertically upward within the interior of the vehicle 10.

Each of the panels 30 and 32 has a guide track 36 formed along its length. Each guide track 36 has a curved or arcuate shape formed of oppositely extending outer portions 38 and 40 which are connected by a gently curved center portion 42.

First and second brackets 46 and 48, respectively, are connected by means of suitable fasteners to the bottom edge of opposite sides of the backlight panel 18. The brackets 46 and 48 have opposed, substantially perpendicular leg portions, one of which is attached to the backlight panel 18. The other leg portion of each of the first and second brackets 46 and 48 carries first and second rollers 50 and 52, respectively, which slidingly ride along the guide tracks 36 in the panels 30 and 32.

Figure 4:
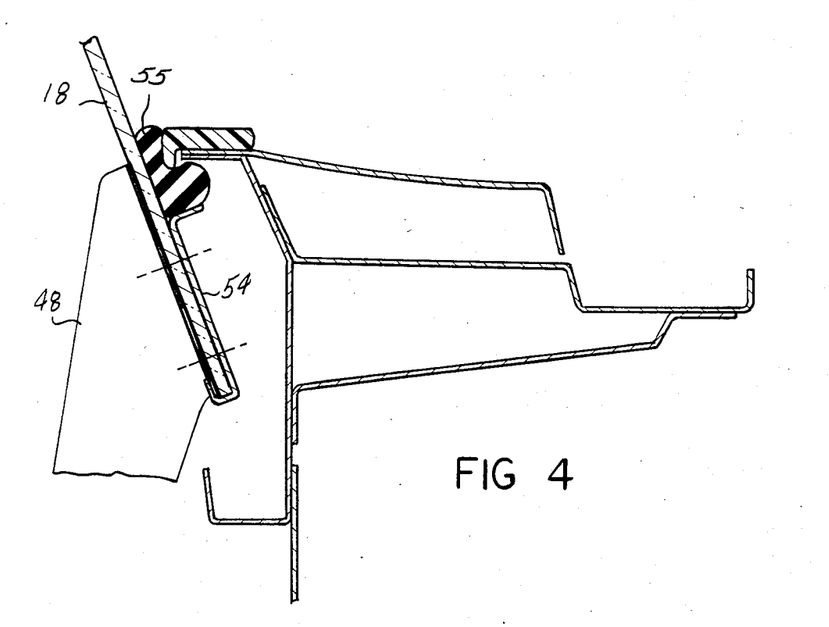
FIG. 4 is a cross-sectional view, generally taken along line 4—4 in FIG. 1.

As shown in FIG. 4, the brackets 46 and 48 are connected to a frame member 54 which extends along the bottom edge of the backlight panel 18. A weather strip or seal member 58 is mounted on the outer upper edge of the frame member 54 to sealingly close the rear opening in the roof structure with the adjacent body panels of the vehicle when the backlight panel 18 is in the raised position.

The retractable backlight apparatus 12 of the present invention also includes means for moving the backlight panel 18 between raised and retracted positions. In a preferred embodiment, the moving means includes a reversible electric drive motor 56, FIG. 3, which includes opposite, outwardly extending, drive shafts 58 and 60. The outer ends of the drive shafts 58 and 60 extend through apertures formed in the bottom of the panels 30 and 32 and have a first pulley 62 fixedly mounted thereon, as shown in FIG. 3. A second pulley 64 is rotatably mounted at the top end of each of the panels 30 and 32. Interconnecting means in the form of a belt 66 extends between the first and second pulleys 62 and 64.

Figures 5, 6:
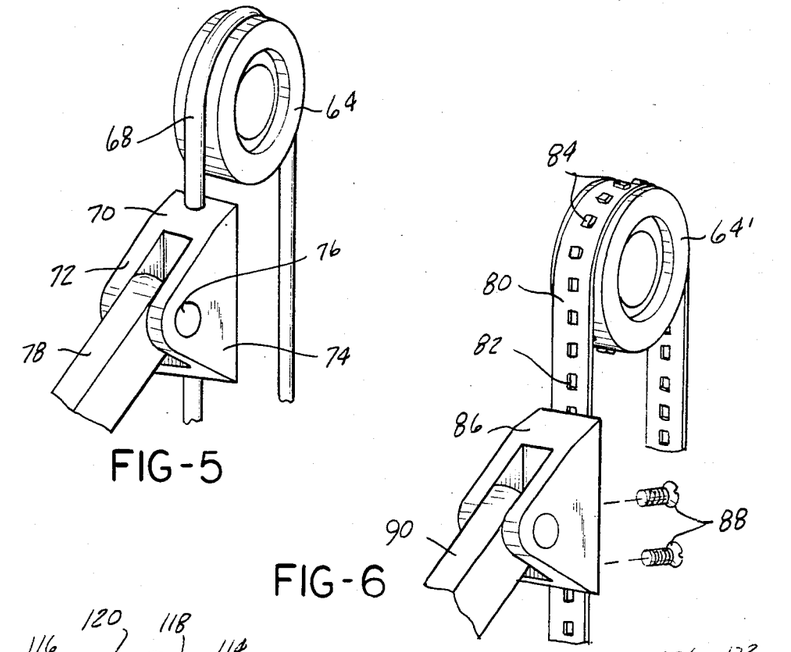
FIG. 5 is a partial, perspective view of one embodiment of the drive means employed in the retractable backlight apparatus shown in FIG. 3.
FIG. 6 is a partial, perspective view of another embodiment of the drive means.

In a preferred embodiment shown in FIG. 5, the interconnecting means 66 comprises a cable 68 which extends around the first and second pulleys 62 and 64 in a closed loop. A holder 70 is molded onto the cable 68 and is movable therewith. The holder 70 includes spaced side portions 72 and 74 which receive a pivot pin 76 therebetween for pivotally mounting one end of a link 78 on the holder 70, as shown in FIG. 5. The opposite end of the link 78 is attached to the second roller 52. In this manner, rotation of the cable 68 in either direction will be transmitted through the link 78 to the roller 52 and thence to the bracket 46 or 48 to effect movement of the backlight panel 18.

In operation, energization of the electric drive motor 56 in one direction will cause the rollers 50 and 52 and traverse downward along the guide track 36 thereby moving the backlight panel 18 from the angled position shown in FIG. 3 in which the backlight panel 18 closes the rear opening 14 in the roof structure 16 to a substantially vertical, stowed position within the interior of the vehicle when the rollers 50 and 52 reach the bottom or second end 40 of each guide track 36.

Alternately, as shown in FIG. 6, the interconnecting means 66 may comprise a perforated tape 80 having a series of spaced apertures or perforations 82 formed along its entire length. The first pulley 64' is modified to include circumferentially spaced projections 84 which engage the perforations 82 in the tape 80 to drive the tape 80 when energized by the drive motor 56. A holder 86 is attached to the tape 80 by means of fasteners 88. A link 90 is pivotally connected at one end to the holder 86 and at the opposite end to the second roller 50 in the same manner as described above for transmitting rotation of the pulley 64' and tape 80 to movement of the rollers 50 and 52.

Figure 7:
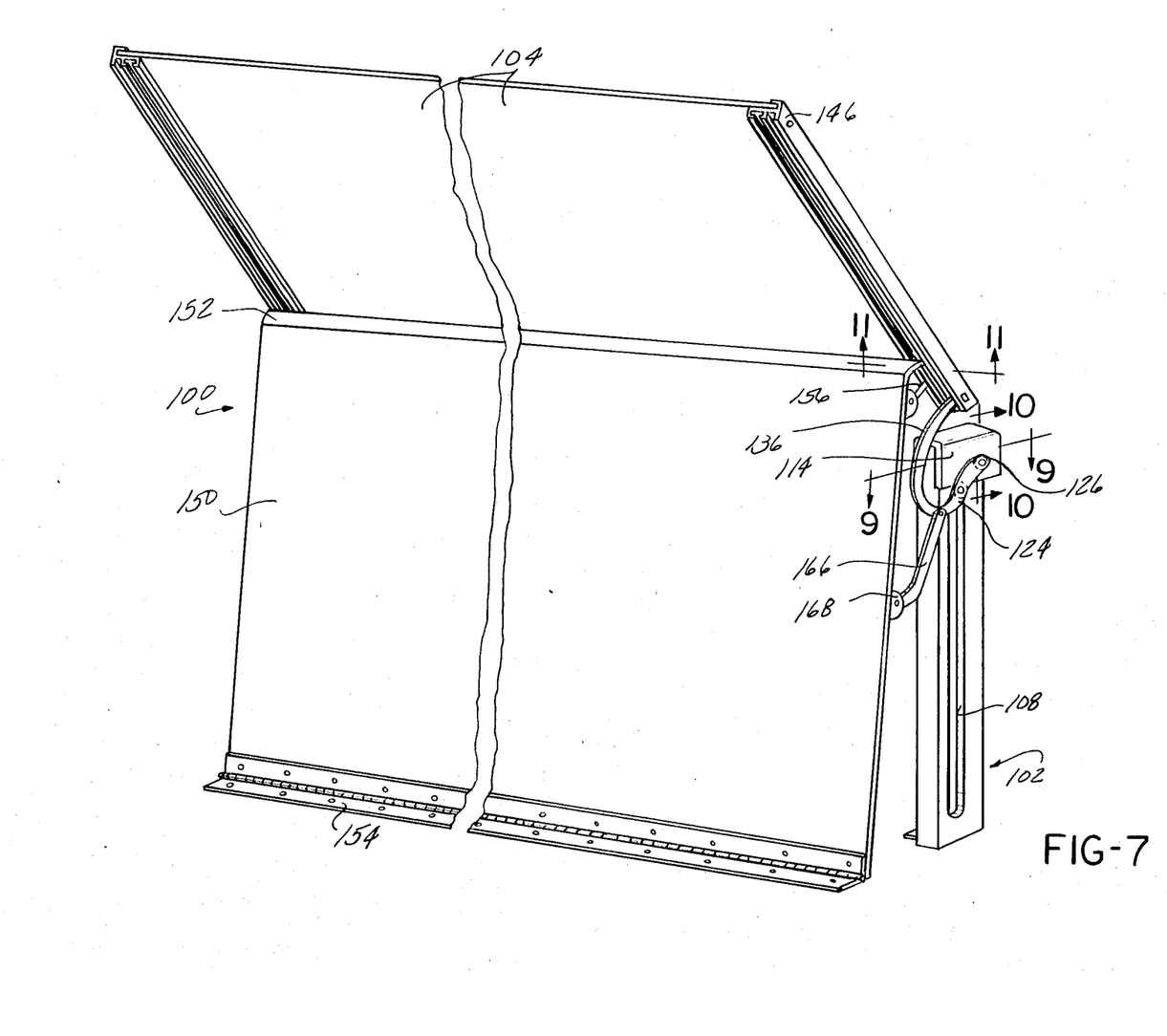
FIG. 7 is a perspective view of another embodiment with the retractable backlight apparatus of the present invention.

Referring now to FIG. 7, there is illustrated at reference number 100 another embodiment of the retractable backlight apparatus of the present invention. In this embodiment, a pair of spaced guide tracks 102 are mounted within the vehicle on opposite sides of the retractable backlight panel 104. Each of the guide tracks 102 includes first and second tracks 106 and 108, respectively, which are separated by a pair of spaced flanges 110 and 112 formed integrally on each guide track 102 as shown more clearly in FIGS. 8 and 9.

Figure 8:
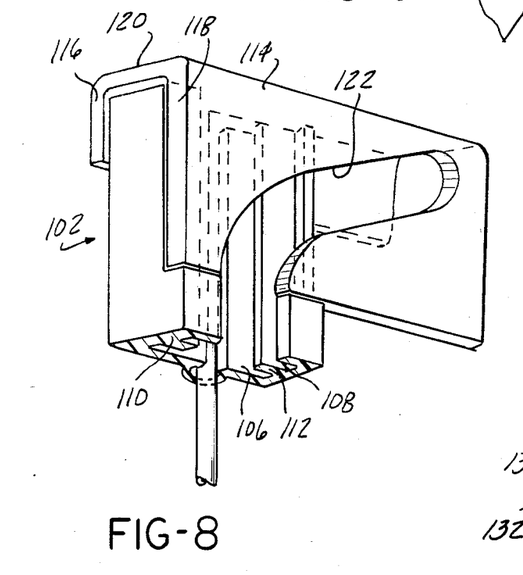
FIG. 8 is a partial, enlarged, perspective view of the upper portion of the guide track shown in FIG. 7.

A cap member 114 is mounted over the upper edge of each guide track 102. The cap member 114 has a U-shaped configuration formed of opposed leg portions 116 and 118 which are connected by an integral central portion 120. A curved or arcuate cam track 122 is formed in the second leg 118 of the cap member 114.

Figure 9:
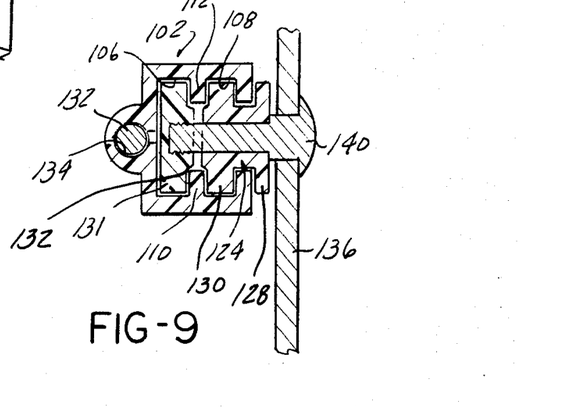
FIG. 9 is a cross-sectional view, generally taken along line 9—9 in FIG. 7.
Figure 10:
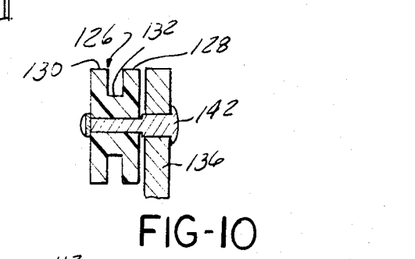
FIG. 10 is a cross-sectional view, generally taken along line 10—10 in FIG. 7.

As shown in FIGS. 7, 9 and 10, first and second rollers 124 and 126, respectively, are disposed for sliding movement within each guide track 102 and curved cam track 122 in the cap member 114. Each of the rollers 124 and 126 includes first and second portions 128 and 130, respectively, which are spaced apart at their outer periphery by a recessed or cut away portion 132. The second portion 130 of each roller 124 and 126 is adapted to ride within the second track 108 of each guide track 102, with the first or outer portion 128 of each roller 124 and 126 being disposed outward from each guide track 102.

As shown in FIG. 9, the first roller 124 is attached to a slider member 131 which rides within the first track 106 in each guide track 102. The slider member 131 is connected to a push-pull cable 132 which extends through a bore 134 formed in the guide track 102. One end of the cable 132 is connected to a suitable drive means, such as a motor, not shown, for raising and lowering the cable 132 within the bore 134 in each guide track 102. This causes movement of the first roller 124 within the guide track 102 and the cam track 122 in the cap member 114, as described in greater detail hereafter.

Figure 11:
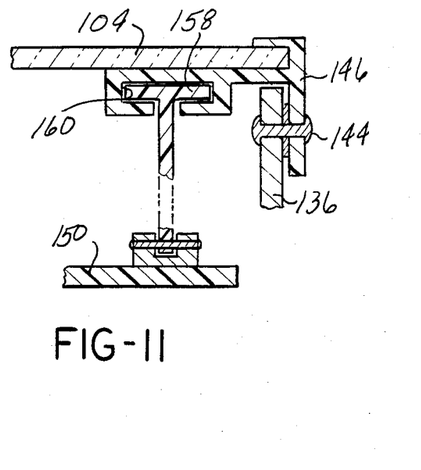
FIG. 11 is a cross-sectional view, generally taken along line 11—11 in FIG. 7, and showing one embodiment of the mounting arrangement of the link and backlight panel guide on the backlight panel.

A link 136 having a substantially U-shaped configuration is connected at one end, as shown in FIGS. 9 and 10, to the first and second rollers 124 and 126 by means of pivot pins 140 and 142. As shown in FIG. 11, the opposite end of each link 136 is connected by means of a suitable fastener 144 to a flange 146 on an extrusion mounted on each side edge of the backlight panel 104. In this manner, movement of the rollers 124 and 126 within the guide tracks 102 and cam tracks 122 causes movement of the link 136.

As shown in FIGS. 7 and 11-15, the retractable backlight assembly 100 includes a closure panel 150 which is pivotally mounted within the vehicle forward of the retractable backlight panel 104. The closure panel 150 comprises a substantially rectangular member having an upper flap 152 formed of a flexible material mounted thereon. The closure member 150 is pivotally mounted within the vehicle 10 by means of a hinge 154, as shown in FIG. 7. The closure panel 150 functions to control the tilting movement of the backlight panel 104 as the panel 104 is moved between the raised and retracted positions, as described in greater detail hereafter.

Guide means 155 are provided for controlling movement of the backlight panel 104 between raised and retracted positions. The guide means 155 includes guide members 156 mounted on opposite sides of the upper edge of the closure panel 150, as shown in FIG. 11. The guide members 156, in one embodiment, comprise an elongated arm having an outwardly extending flange 158. The flange 158 slidingly rides within a slot 160 formed in the extrusion 146 surrounding the edge of the backlight panel 104.

Figure 12:
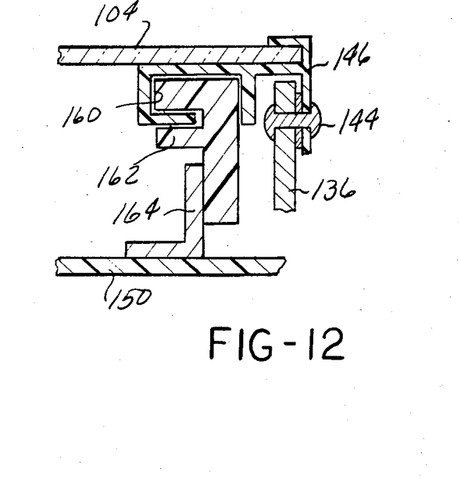
FIG. 12 is a cross-sectional view of another embodiment for mounting the link and the backlight panel guide on the backlight panel.

Another embodiment of the backlight panel guide means 155 is illustrated in FIG. 12. In this embodiment, the guide means 155 includes a connector member 162 which slidingly rides within the slot 160 formed in the extrusion 146. A connector 162 is attached to the rear surface of the closure panel 150 to effect the desired guiding of the backlight panel 104.

Figure 13:
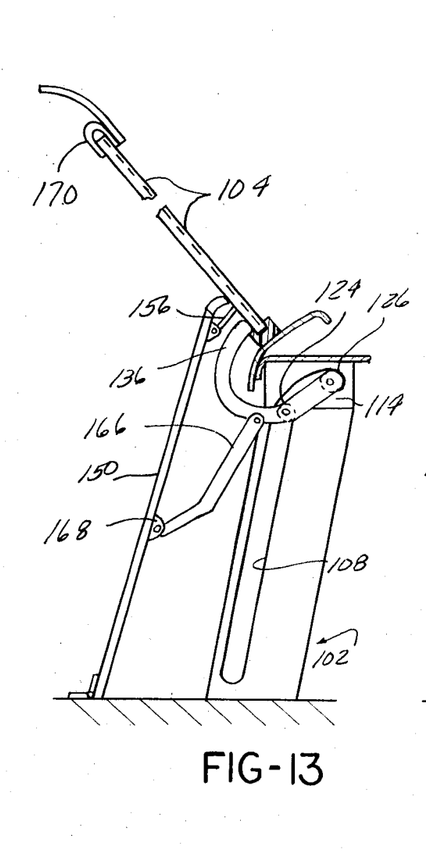
FIG. 13 is an elevational view showing the position of the components of the retractable backlight apparatus shown in FIG. 7 when in the fully raised position.
Figure 14:
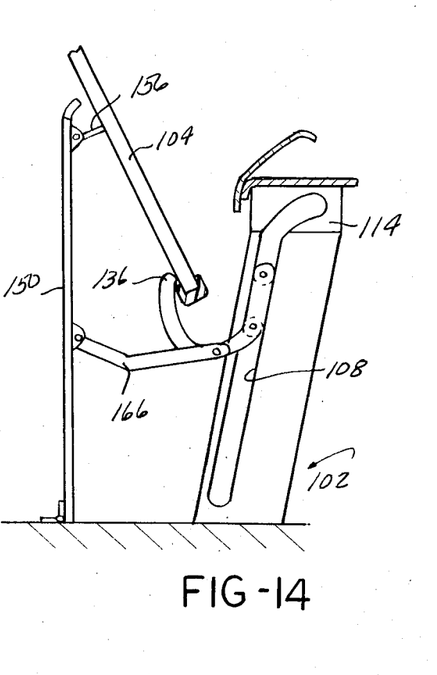
FIG. 14 is an elevational view showing the position of the components of the retractable backlight apparatus shown in FIG. 7 when in a partially retracted position.
Figure 15:
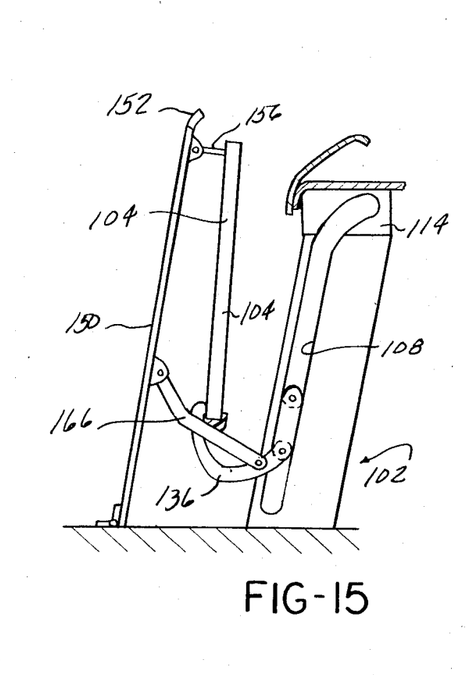
FIG. 15 is an elevational view showing the position of the components of the retractable backlight apparatus shown in FIG. 7 when in a fully retracted position.

As shown more clearly in FIGS. 13, 14 and 15, a control arm 166 is pivotally connected at one end to an intermediate portion of the link 136 and at an opposed end to a central portion of the closure member 150 by means of a pivot connection 168, such as a clevis. In this manner, movement of the link 136 will cause pivoting of the closure member 150 in either clockwise or counterclockwise directions as the backlight panel 104 is moved between raised and retracted positions.

As shown in FIG. 13, the retractable backlight assembly 104 is disposed in the fully raised position in which the backlight panel 104 closes the rear opening 14 in the roof structure 16 of the vehicle 10. As shown in FIG. 13, the rollers 124 and 126 have moved to the upper portion of the guide tracks 102, with the second roller 126 moving outward along the curved cam track 122 in the cap member 114. This causes the link 136 to tilt and rotate the backlight panel 104 into sealing engagement with the roof structure surrounding the rear opening 14 in the vehicle 10.

As also shown in FIG. 13, the upper edge of the backlight panel 104 has been received in a channel member 170 mounted along the top edge of the rear opening 14 in the vehicle roof structure 16. When it is desired to retract the backlight panel 104 within the interior of the vehicle 10, the drive means is energized to move the cable 132 which pulls the interconnected rollers 124 and 126 downward along the second track 108 in the guide tracks 102, as shown in FIG. 14.

Movement of the rollers 124 and 126 downward along the straight portion 108 of the guide tracks 102 rotates the links 136 to drop the bottom edge of the backlight panel 104 downward, and pivoting the bottom edge of the backlight panel 104. Due to the backlight panel guide means 156 connected to the top end of the closure member 150 and the control arm 166 extending between the link 136 and the closure member 150, the closure member 150 is pivoted n a counter-clockwise direction, as shown in FIGS. 13-15, towards the front of the vehicle thereby providing space for retraction of the backlight panel 104.

When the rollers 124 and 126 reach the bottom of the straight portion 108 of the guide tracks 102, the retractable backlight panel 104 will be in a substantially vertical position, as shown in FIG. 15. The guide means 156 and the control arm 166 will also have caused the closure panel 150 to pivot in a clockwise direction toward the rear end of the vehicle 10 such that the upper flap 152 of the closure member 150 will be deployed over the upper edge of the backlight panel 104, closing off the space above the backlight panel 104.

Figure 16:
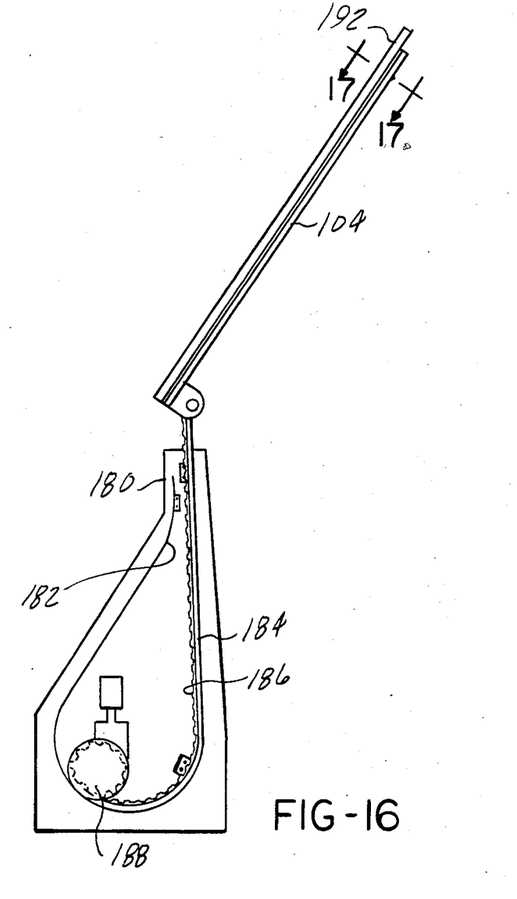
FIG. 16 is a side elevational view of another embodiment of the retractable backlight apparatus of the present invention.
Figure 17:
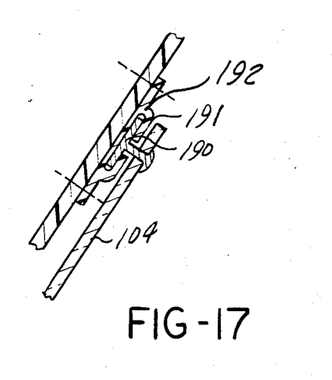
FIG. 17 is a partial, cross-sectional view, generally taken along line 17—17 in FIG. 16.

Referring now to FIGS. 16 and 17, there is illustrated yet another embodiment of the retractable backlight mechanism of the present invention. In this embodiment, a pair of opposed plates 180, only one of which is shown in FIG. 16, are mounted interiorally within the vehicle 10 on opposite sides of the backlight panel 104. A guide 182 having a looped, arcuate configuration is mounted on each plate 180 for controlling the path of movement of a drive belt 184. The drive belt 184 has a plurality of spaced projections 186 formed along its length which are engaged by a drive motor 188 mounted on the plate 180 to cause bi-directional movement of the drive belt 184. One end of the drive belt 184 is pivotally connected to a bottom edge of the retractable backlight panel 104, as shown in FIG. 16.

Movement of the upper edge of the backlight panel 104 is controlled by means of guide members 190 attached to the upper edge of opposed sides of the backlight panel 104 as shown in FIG. 17. The guide members 190 ride within a slot 191 formed within a guide track 192 which is attached to the interior of the roof structure of the vehicle 10. The guide track 192 is formed of a flexible material so as to be foldable upon retraction of the convertible top of the vehicle. When the convertible top is in the raised position, the guide tracks 192 are extended to form a straight, elongated slot through which the guide members 190 move to control sliding movement of the upper edge of the backlight panel 104 as the backlight panel 104 is moved between the raised and lowered positions.

In summary, there has been disclosed a retractable backlight apparatus for use in vehicles and, in particular, vehicles having a convertible top which can be retracted and stowed within the interior of the vehicle. The retractable backlight apparatus of the present invention effects raising and lowering of the backlight panel independent form operation of the convertible top of the vehicle. This eliminates the need for automatically disengaging the backlight panel from the convertible top prior to retraction of the convertible top as was previously necessary. In addition, the unique retraction mechanism apparatus of the present invention enables a larger sized backlight panel to be mounted within the convertible top than previously possible. Finally, the retractable backlight apparatus of the present invention is simply constructed for a low manufacturing cost and long term reliability.

What is claimed:

1. A retractable backlight panel for a vehicle having a roof structure with a rear window opening comprising:
   a backlight panel for closing the rear opening in the roof structure;
   panel members mounted in the vehicle on opposed sides of the backlight panel;
   a guide track formed in each panel member;
   roller means connected to the backlight panel and movable along the guide tracks for controlling movement of the backlight panel; and
   means connected to the roller means, for moving the rollers and the backlight panel connected thereto between raised and retracted positions, the moving means comprising:
   a reversable electric drive motor having opposed, rotatable output shafts;
   first and second pulleys mounted on each of the panel members, the output shafts of the drive motor being connected to the first pulley for rotating the first pulley;
   means for interconnecting the first and second pulleys for transmitting rotation therebetween; and
   a link, mounted on the interconnecting means and connected to the roller means, for transmitting rotation of the first and second pulley means to translation of the roller means along the guide track.

2. The retractable backlight panel of claim 1 wherein the interconnecting means comprises a cable.

3. The retractable backlight panel of claim 1 wherein the interconnecting means comprises:
   a tape having a plurality of spaced perforations formed therein; and
   the second pulley having a plurality of circumferentially spaced projections mounted thereon, the projections engaging the perforations in the tape to movably drive the tape.

4. A retractable backlight for a vehicle having a roof structure with a rear window opening comprising:
   a backlight panel for closing the rear opening in the roof structure;
   panel members mounted in the vehicle on opposed sides of the backlight panel;
   a substantially vertically extending track formed in each panel member;
   the guide track having a first straight section and a second upper, curved section; the straight and curved sections defining means for guiding the backlight panel into engagement with the roof structure of the vehicle when in the raised position to close the rear window opening in the vehicle structure and to retract the backlight panel into a substantially vertical orientation within the interior of the body;
   roller means connected to the backlight panel and movable along the guide tracks for controlling movement of the backlight panel; and
   a first link connected to the roller means for moving the roller means and the backlight panel connected thereto between the raised and retracted positions.

5. The retractable backlight of claim 4 further including:
- a closure panel being pivotally mounted in the vehicle forward of the backlight; and
- a second link connected to the first link at one end and to the closure panel at a second end to pivot the closure panel as the backlight panel moves between the raised and retracted positions.

6. The retractable backlight of claim 5 further including:
- guide means mounted on the closure panel for slidingly receiving opposed sides of the backlight panel therethrough.

7. The retractable backlight of claim 6 wherein the guide means include:
- a channel mounted on the backlight panel and extending along the length of each side of the backlight panel;
- first and second arms, mounted on opposed sides of the closure panel, for sliding movement within the channels on the backlight panel.

8. A retractable backlight for a vehicle having a roof structure with a rear window opening comprising:
- first and second panels mounted within the vehicle on opposite sides of the backlight panel;
- arcuate guides formed on each of the first and second panel members;
- drive belts slidingly movable along the guides on each of the panels and connected at one end to the bottom of the backlight panel;
- drive means for driving the drive belts;
- guide tracks formed on the roof structure of the vehicle on opposite sides of the rear window opening; and
- arms connected to the backlight panel for sliding movement within the guide tracks to control movement of the upper end of the backlight panel between a raised position closing the rear window opening and a retracted substantially vertically extending position within the interior of the vehicle.

* * * * *